United States Patent

[11] 3,596,501

[72] Inventors: Donald R. Forry, Columbus, Ohio; Charles A. Cummings, Columbus, Ohio; Robert Russell, Columbus, Ohio; Ben C. Peralta, Fort Wayne, Ind.; Albert M. Schaffer, Cedar Rapids, Iowa; Dale A. Denny, Columbus, Ohio; William H. Welch, Columbus, Ohio
[21] Appl. No.: 847,996
[22] Filed: Aug. 6, 1969
[45] Patented: Aug. 3, 1971
[73] Assignee: Abbott Laboratories

[54] METHOD AND APPARATUS FOR DETERMINING VACUUM LEVEL IN SEALED CONTAINERS
17 Claims, 8 Drawing Figs.

[52] U.S. Cl. .................................................. 73/52, 73/45.1, 73/45.4, 73/69
[51] Int. Cl. ............................................................. G01m 3/00
[50] Field of Search ........................................... 73/52, 49.2, 69, 45.1, 45.2, 45, 45.4, 67.1

[56] References Cited
UNITED STATES PATENTS

| | | | |
|---|---|---|---|
| 1,869,067 | 7/1932 | Malmquist | 73/52 |
| 2,112,621 | 3/1938 | Henszey et al. | 73/52 |
| 3,162,039 | 12/1964 | Schloss | 73/67.1 |

Primary Examiner—S. Clement Swisher
Assistant Examiner—William A. Henry, II
Attorney—Bair, Freeman and Molinare

ABSTRACT: A method and apparatus for testing the vacuum level in sealed containers includes a support for the container having an accelerometer attached thereto. The container and support is accelerated by an impacting hammer to cause hydrodynamic oscillations of the contents in the container which in turn are transmitted to and sensed by the accelerometer. If the vacuum level in the container is insufficient, the oscillations are damped and if the vacuum level is sufficient the container contents freely oscillate to produce vibrating oscillations in the container support. The accelerometer produces signals having characteristics correlated to the vibrating oscillations and the containers are accepted or rejected in response to the accelerometer signals.

Fig. 1

INVENTORS
DONALD R. FORRY, CHARLES A. CUMMINGS,
ROBERT C. RUSSELL, BEN C. PERALTA,
ALBERT M. SCHAFFER, DALE A. DENNY &
WILLIAM H. WELCH
BY
Bair, Freeman & Molinare
ATTORNEYS

Fig. 8

METHOD AND APPARATUS FOR DETERMINING VACUUM LEVEL IN SEALED CONTAINERS

BACKGROUND OF THE INVENTION

The present invention relates to a sealed container-testing apparatus and method and, more particularly, to a testing apparatus and method for determining the adequacy of vacuum level obtaining in sealed containers.

In the past, various methods and apparatus have been employed in the testing of containers for the adequacy of vacuum level and, in particular, sealed containers which contain a food product therein. It is readily apparent that an inadequate seal and loss of vacuum level in such food containers, more likely than not, will result in spoilage of the contents and possibly physical harm to the consumer. The prevailing apparatus and methods in the past generally employ a dimensional-measuring principle wherein the amount of deflection of some portion of the container is measured. For example, the vacuum level inside a bottle having a metal screw-on lid can be determined by measuring the amount by which the lid is deflected inwardly by the vacuum. For containers of this sort, such direct measuring devices are usually satisfactory. However, for certain types of containers such deflection-measuring methods and apparatus may be inaccurate and perhaps totally unusable. For example, where the container is made of glass and is fitted with a rigid cap or closure which is incapable of deflection, the deflection-measuring procedure cannot be used. Also where the closure or ends of the container are of relatively small diameter such measurement procedures may be inaccurate or become totally unusable since the magnitude of deflection for a given vacuum is substantially reduced where the diameter of the deflecting cap or closure is reduced. Moreover, some containers do not provide end surfaces which are exposed to the actual vacuum in that portion of the container which holds the contents and thus a measurement of deflection of such end closures is not indicative of the vacuum level in the portion of the container which is of primary importance.

Such a container for the packaging of infant formula is disclosed in U.S. Letters Pat. No. 3,335,890, issued to Grundmann et al. on Aug. 15, 1967. This presterilized infant formula container is divided into two portions, the bottom sealed portion containing the liquid formula and the upper sealed portion carrying a sterilized nipple. After such container has been sterilized by steaming and the container is being cooled to form the vacuum seal, the upper nipple portion becomes sealed off from the lower formula containing portion before complete cooling has been effected. Thus, the vacuum levels obtaining in the upper portion and lower portion are not generally identical to each other; measurement of the degree of indentation of the upper portion therefore will not be indicative of the vacuum level in the lower rigid glass portion which contains the formula. Moreover, in such a container, the top end of the upper nipple-carrying portion is of small diameter and thus the magnitude of deflection for a given vacuum level is substantially diminished.

One form of vacuum level testing has been devised which overcomes some of the difficulties encountered in the aforementioned deflection measurement apparatus. When a liquid filled container is subjected to a blow causing its contents to cavitate, audible sound frequencies are produced. The audible characteristics of that cavitation vary with the degree of vacuum obtaining in the container. By locating a microphone closely adjacent the container to listen to and convert the audible sound waves generated by the cavitation into an electronic signal it is possible to automatically detect those containers having a low vacuum level. In practice such audible sound apparatus is apt to be difficult to use, however, since sound waves other than the waves generated by the cavitating container contents are apt to be received by the microphone and cause an erroneous signal. This is particularly true when the testing apparatus is located on a production line where high background noise levels are common.

The method and apparatus incorporating the principles of the present invention overcome the many disadvantages encountered by the prior art and may, in general, be used with any sealed container having liquid-type contents, irrespective of the container's physical characteristics such as shape, size, etc. Moreover, the method and apparatus of this invention are extremely sensitive to minor variations in vacuum level while being capable of use in environments in which the ambient noise level is extremely high, such as the noise levels encountered on a production line. In the method and apparatus of our invention, oscillating vibrations in the container produced by hydrodynamic oscillation of the container contents when the container is exposed to a rapid accelerating impact are measured by an accelerometer and a signal is produced which is indicative of the vacuum level in the container. Our method and apparatus is readily capable of use for indicating the vacuum level in a wide variety of containers including such multipart containers as disclosed in the aforementioned patent. Also our invention may be employed to selectively and accurately reject containers having an unacceptable vacuum level even where the vacuum level is close to an acceptable level.

SUMMARY OF THE INVENTION

In one principal aspect, the sealed-container-testing apparatus constructed in accordance with the principles of our invention includes means for supporting the sealed container and an impacting means for accelerating the container with a sufficient acceleration force to produce hydrodynamic oscillations of the container contents, the character of these oscillations depending on the vacuum level in the container. Such hydrodynamic oscillations are transmitted to the container and its supporting means to produce corresponding vibrational oscillations of the supporting means and a sensing means. The sensing means, mounted on the supporting means, generates an electrical signal having a wave shape related to the vibrational oscillations of the sensing means. Discriminating means responsive to the electrical signals measures the vacuum level in the container.

In another principal aspect, the method employing the principles of our invention includes abruptly accelerating the container with a force sufficient to produce substantial hydrodynamic oscillations of the contents of the container. These oscillations cause the container itself to vibrate with respect to a seismic mass. The characteristics of the oscillatory motion between the container and seismic mass are sensed and the container is accepted or rejected in response to a determination of the magnitude and duration of this motion.

These and other objects, features and advantages of the invention will become evident upon consideration of the following detailed description.

BRIEF DESCRIPTION OF THE DRAWINGS

In the course of the detailed description which follows, frequent reference will be made to the attached drawings in which.

DESCRIPTION OF THE PREFERRED EMBODIMENT

Details of the Mechanical Construction

Figure 1:
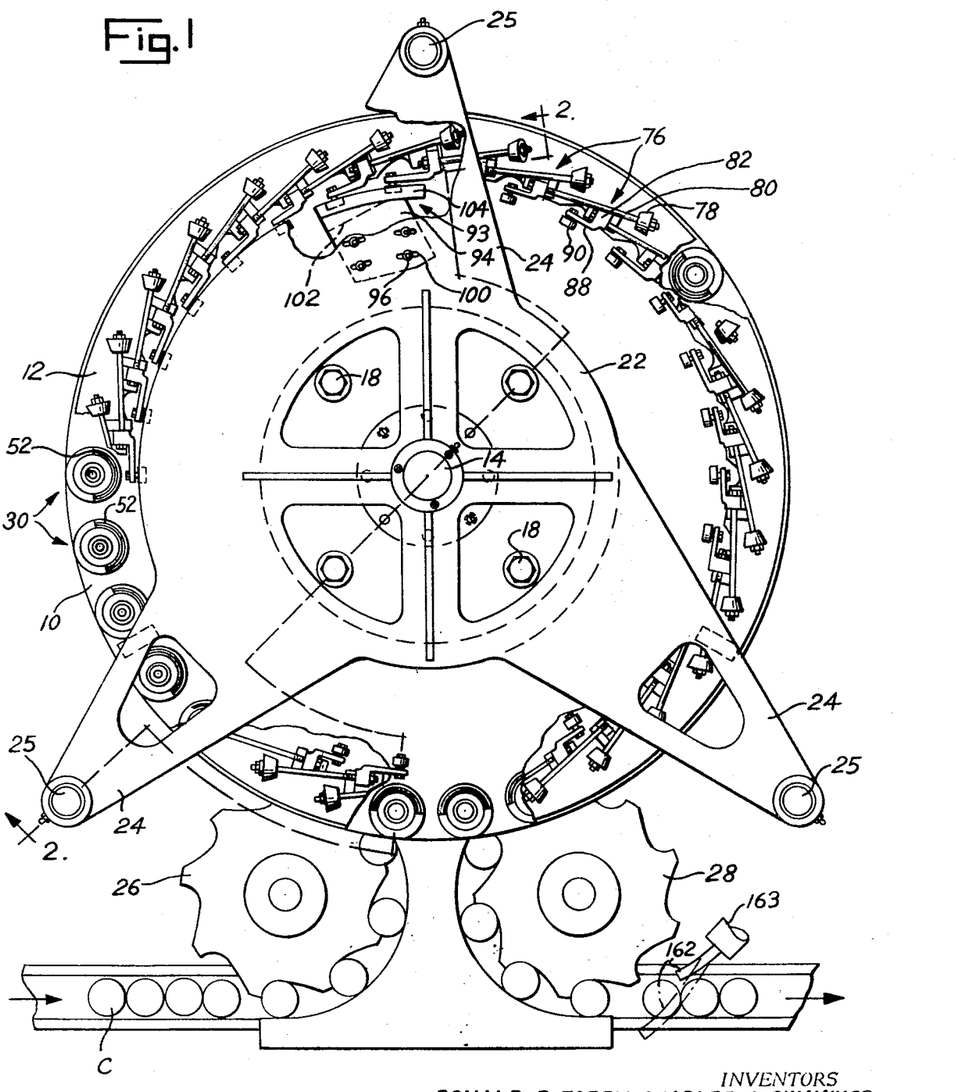
FIG. 1 is an overhead, plan view of the vacuum-level-measuring apparatus of our invention with portions thereof broken away to show various underlying details.
Figure 2:
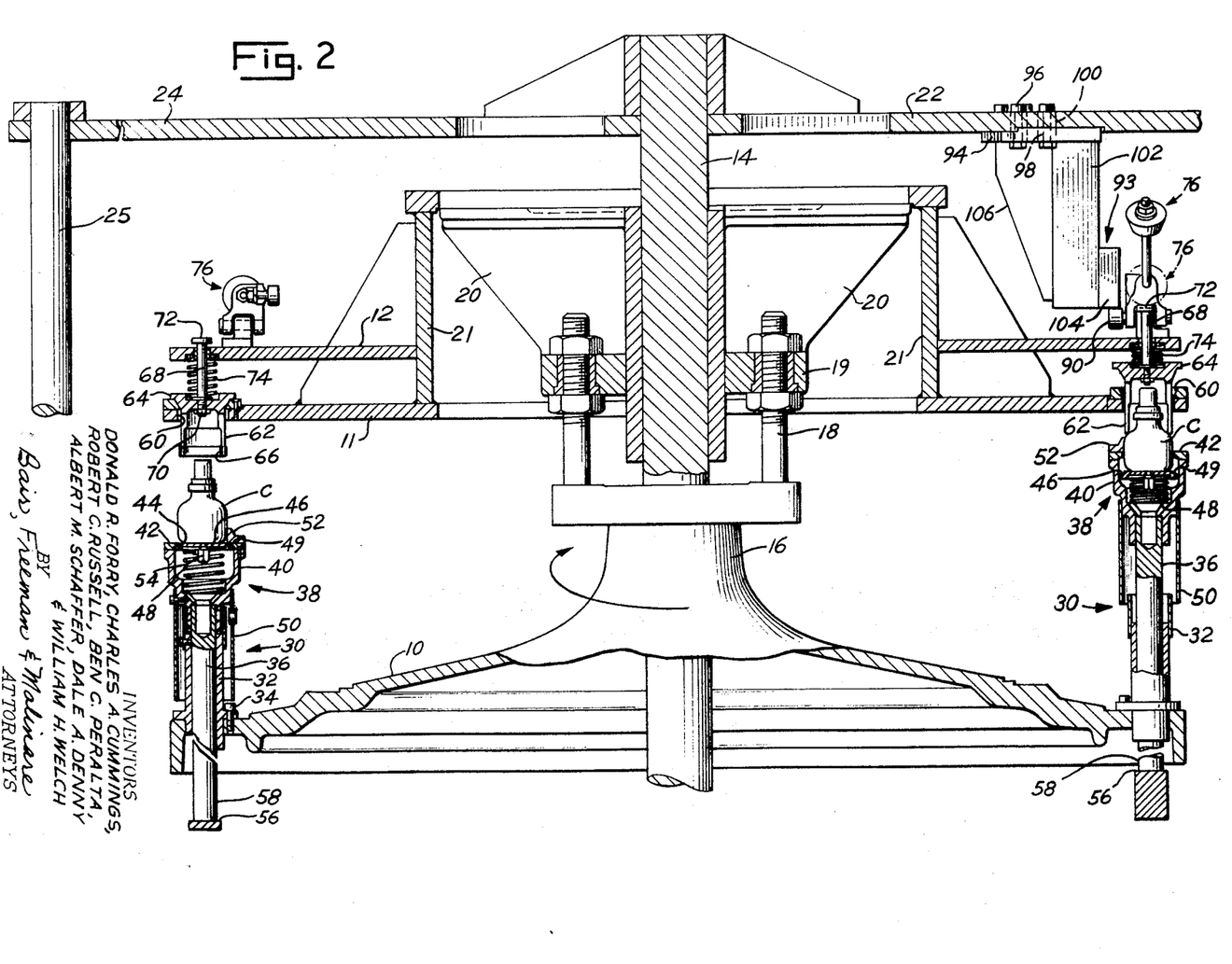
FIG. 2 is a cross-sectioned elevation view of the apparatus of our invention taken substantially along line 2-2 of FIG. 1.

FIGS. 1 and 2 show a preferred embodiment of the apparatus constructed in accordance with the principles of our invention. In general, the apparatus comprises a plurality of rotating, generally circular platforms including a container support platform 10 (best seen near the bottom of FIG. 2), an impact collar platform 11 and a hammer assembly platform 12. A cylindrical stationary axle shaft 14 is journaled vertically through a central sleeve 16 on platform 10 and the container support platform 10 is rotatably driven about the stationary shaft by suitable drive means (not shown). The rotatable support platform 10 is coupled through a plurality of vertically extending bolts 18, a radially extending flange 19 and a plurality of radially extending webs 20 and a circular flange 21 to the impact collar platform 11 and hammer assembly platform 12. The latter-mentioned platforms are thus also rotatably driven about the stationary shaft 14. Surmounting the entire structure is a stationary cam-carrying platform 22 which is generally circular in shape and includes a plurality of outwardly extending overhanging arms 24 which are stationarily affixed by supporting rods 25 to the rigid base (not shown) of the apparatus to form a rooflike structure over the top of the testing apparatus. A pair of gearlike feed devices 26 and 28 are provided to respectively feed the various filled containers C to the apparatus and then remove the containers after testing from the apparatus.

The container support platform 10 includes a plurality of container support assemblies 30, two of which are clearly seen in FIG. 2. Each support assembly 30 comprises a sleeve member 32 which is rigidly fixed to the upper side of platform 10 by way of bolts 34 or the like, and a sliding cylindrical piston rod 36 is axially journaled through the sleeve 32 and through the platform 10. A head housing 38 is carried at the upper end of the piston rod 36 and comprises a cylindrical cup-shaped housing 40 the open end of which faces upwardly. An annular inwardly depending shoulder ring 42 is positioned about the rim of the housing 40, the opening 44 of the annular ring 42 being at least as large in diameter as the container to be tested but smaller in diameter than the opening of the cup shaped housing 40. A circular plate 46 is positioned in the housing 40 and urged upwardly against the inwardly depending underside of the ring 42 by a suitable coiled compression spring 48. The plate 46 includes a shouldered peripheral rim 49 which engages the ring 42 such that the major surface area of the plate is flush with the top surface of the ring 42 when the plate is in its uppermost position. A downwardly depending cylindrical skirt 50 is attached to the underside of the housing 40 and axially receives the piston rod 32, bottom end of housing 40 and sleeve member 32. An arcuately shaped positioning shoulder 52 is carried on the upper surface of the ring 42 to accurately position the container on the support assembly once it has been introduced thereon by the input feed device 26. Attached centrally to the underside of the plate 46 is an accelerometer 54, the construction of which will be described in more detail later.

The piston rod 36 is moveable in the vertical direction and is positioned in its lowermost position as the support assembly passes the input feed device 26. The left support assembly in FIG. 2 is shown in such position. When a container has been positioned on the support assembly 30, support platform 10 and the particular support assembly continue to rotate away from the feed device in a clockwise direction as viewed in FIG. 1. A stationary cam surface 56 which is mounted on the base of the assembly (not shown) is contacted by the lower distal end 58 of the piston rod 36 as the support assembly rotates and the cam surface 56 urges the rod 36 in an upward direction to a position as depicted on the right in FIG. 2.

The impact collar platform 11 includes a plurality of spaced circular openings 60 adjacent its periphery, each of the openings being arranged to align and rotate in unison with one of the support platform assemblies 30 in the lower platform 10, since platform 11 is positively coupled to platform 10 by bolts 18. An inverted cup-shaped collar member 62 is carried in each of the openings 60. Each collar member includes an outwardly extending flange rim 64 at its upper closed end which is larger in diameter than opening 60, such that when the collar is positioned in the opening its downward movement is limited by contact of the rim 64 with the upper surface of the platform 11 adjacent the periphery of the opening. The open end 66 of the cup shaped collar 62 is of such diameter and axial length that the collar will fit downwardly over the substantially smaller diameter closure and neck of the container and contact of the larger diameter upper shoulders of the container, as shown in FIG. 2. An impacting stud 68 is firmly attached, as by nut 70, in the center of the impact collar bottom and extends axially vertically upward terminating in a somewhat enlarged impact head 72. A compression spring 74 extends about the stud between the closed upper end of the impact collar 62 and the lower side of the hammer assembly platform 12, normally urging the collar 62 and pin 68 in a downward direction as shown at the left side of FIG. 2.

Figures 3, 4, 5, 6, 7:
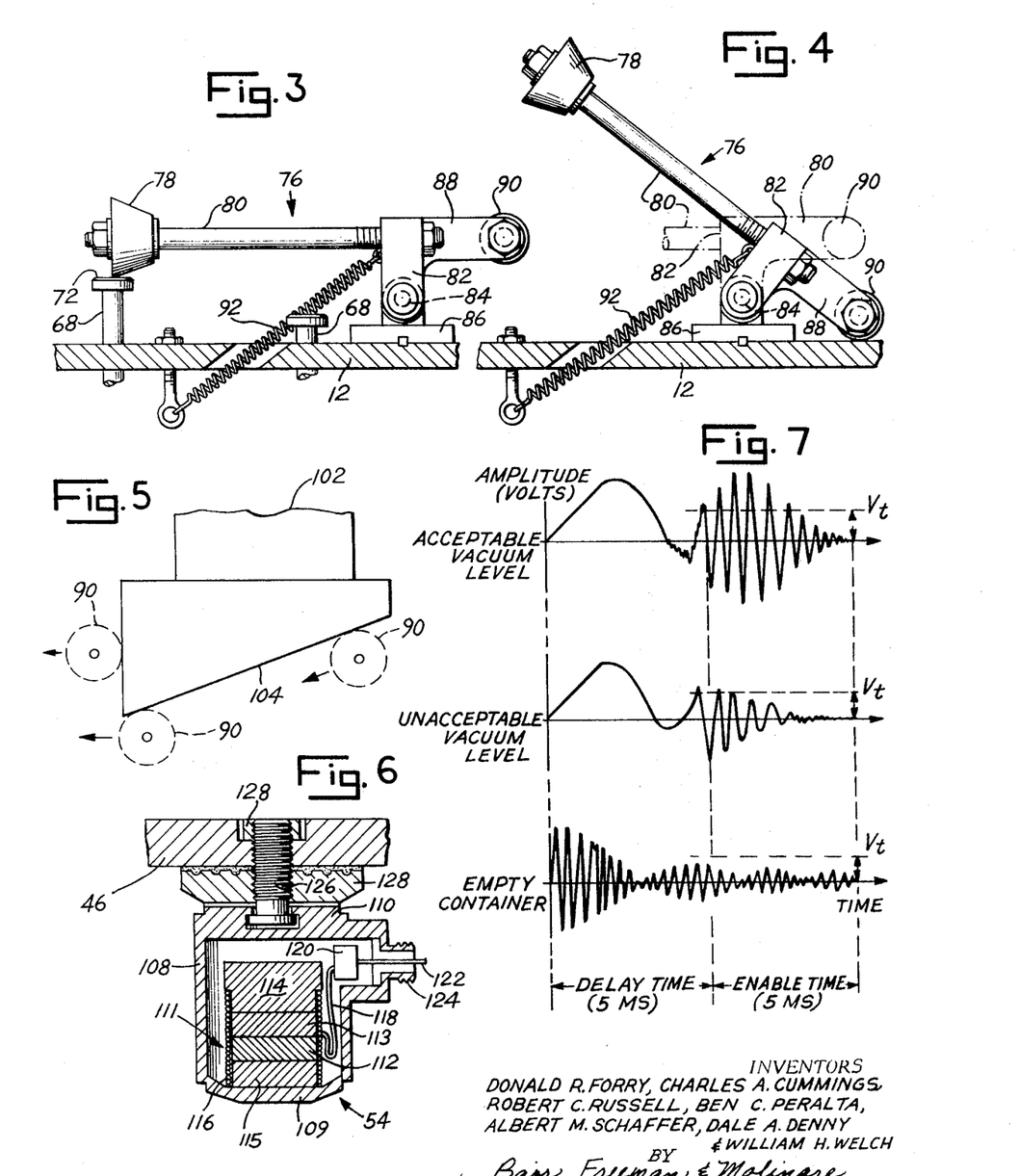
FIG. 3 is a side elevation view of one of the impacting devices of our invention.
FIG. 4 is a side elevation view of the impacting device of FIG. 3 in the process of actuation.
FIG. 5 is a schematic representation of the operation of the cam-actuating device of our invention.
FIG. 6 is a cross-sectioned side elevation view of the accelerometer of the testing apparatus of our invention.
FIG. 7 is a plot showing the wave form of typical signals produced by the accelerometer for (1) containers having an acceptable vacuum level therein; (2) containers having an unacceptable vacuum level therein; and (3) containers which are empty.

For each support assembly 30 and impact collar 62, an impacting hammer assembly 76 is carried on the hammer assembly platform 12. Since the hammer assembly platform 12 is rigidly formed as an integral part of the impact collar platform 11, each hammer assembly 76 will rotate in unison with its corresponding impact collar and container support assembly. Referring particularly to FIGS. 2-4, each hammer assembly 76 comprises striking head 78 formed of a suitable resilient yet substantially durable material, such as rubber, the striking head being carried on a distal end of a bolt arm 80. The length of the arm is such that the striking head is adapted to align with and strike the head 72 of stud 68 of its associated impact collar. The distal end of the arm 80 opposite the head 78 is firmly threaded to a pivotal mounted bracket 82 which is pivotally mounted by a pivot pin 84 to a stationary bracket 86 securely carried on the upper face of the hammer assembly platform 12. Extending in a direction from the pivotal bracket 82 opposite the striking head 78, is an actuating arm 88 having a roller 90 rotatably mounted at its distal end. A tension spring 92 is connected between the impact member platform 12 and the upper end of the pivotal bracket 82 adjacent arm 80 and in vertically spaced relationship to the pivot pin 84.

The uppermost cam platform 22, as mentioned previously, is stationary during operation and carries a cam assembly 93 for actuating the hammer assemblies 72, the position of the cam assembly defining the point in the course of rotation of the container at which testing occurs. Referring particularly to FIGS. 1 and 2, the cam assembly 93 comprises a flat horizontal plate 94 mounted to the underside of platform 22 by bolts 96 which extend through apertures 98 in the plate 94 and slotted apertures 100 in the platform 22, the slotted apertures allowing adjustment of the cam assembly. A downwardly depending flange 102 extends from the outer edge of plate 94 and an inclined cam surface 104 is fixed to the lower edge of the flange 102 in the track of the hammer assembly rollers 90. Suitable webs 106 may be provided to strengthen the plate and flange construction. The cam surface 104 which faces platform 12 is spaced at a varying distance from the top side of that platform such that its spacing is at a maximum and decreases to a minimum in a clockwise direction of rotation of the apparatus as viewed in FIG. 1 and from right to left as viewed in FIG. 5.

The accelerometer 54 may take a variety of known forms, a preferred one of which is shown in detail in FIG. 6. The accelerometer includes a hollow housing 108 which is closed at both ends 109 and 110. A crystal element 111 comprises a pair of quartz crystals 112 and 113 which are sandwiched between a seismic mass 114 and a back plate 115. These elements are held together under tension by a preload sleeve 116, the preload sleeve 116 allowing seismic mass 114 to move axially in the housing to alternately compress and relieve the quartz crystals 112 and 113 when acceleration is imparted to the accelerometer housing 108. As the pressure on the quartz crystals is varied due to the effect of the seismic mass 114, an electric potential is generated by the crystals which is conducted through a conductor 118 to the control electrode of a field effect transistor 120, also located in the housing 108, and thence through conductor 122 which extends through a suitable threaded coupling 124 on the housing. The top end 110 of the housing 108 is attached to the underside of plate 46 by a mounting stud 126 and nut 128 such that the accelerometer hangs beneath the plate within the enclosure provided by housing 40.

DESCRIPTION OF THE MECHANICAL OPERATION

Before describing the details of the discrimination circuit, the mechanical operation of our invention will be described. When it is desired to test the adequacy of vacuum level of a plurality of containers passing down the production line, the container testing apparatus of our invention is actuated and a power drive (not shown) drives the container support platform 10 rotatably about the stationary axle shaft 14 in a clockwise direction as viewed in FIG. 1. Since the impact collar platform 11 and hammer assembly platform 12 are rigidly coupled through bolts 18 to the rotating container support platform 10, platforms 11 and 12 will also commence rotation in unison with platform 10 about axle 14, the containers C to be tested are now fed, one at a time, by the input feed device 26 onto individual successive support assembly 30 as they pass the discharge of the feed device. The operation will be described in terms of a single given container to be tested since the sequence will be substantially identical for the remaining containers.

Shortly after the container is introduced onto its support platform 30, it is rotated out of alignment with the input feed device 26 and the lower distal end 58 of its piston rod 36 contacts the stationary cam surface 56 on the base of the apparatus (not shown). Such contact urges the piston rod 36 in an upward direction from the lower position shown at the left of FIG. 2 to the upper position shown at the right of FIG. 2. As the rod 36 moves upwardly, the cup shaped head 40 moves upwardly along with the plate 46 and container supported thereon until the relatively large diameter upper shoulder of the container contacts the lower peripheral rim of the downwardly opening impact collar 62. At this point upward movement of the container C continues, lifting the impact collar 62 against the force of spring 74 while the plate 46 and bottom of the container move into the enclosure formed by the housing 40 against the force of spring 48. The container is now securely positioned as shown at the right of FIG. 2 and is ready for testing.

In such ready position, the container C is trapped between the spring-loaded collar 66 and plate 46 and the force exerted by spring 74 constrains motion of the container in the upward direction. The spring rate and force exerted by the springs 48 and 74 are selected such that the spring rate is sufficiently low to allow the container contents to cavitate when the blow is struck. If the springs are too stiff, sufficient signals would not be produced on impact. On the other hand, the force exerted by the springs is selected such that it is sufficiently large to insure that plate 46 remains in continuous contact with the container immediately after impact. Specific spring rates and forces will of course vary with different container contents and container constructions and the selection of suitable spring rates and forces under various conditions is well within the skill of one skilled in the art.

The positioned container and its associated support assembly 30, impact collar 62, and hammer assembly 76 continue to rotate in unison about the axle shaft 14. When the container approaches the inclined cam surface 104, the roller 90 of the hammer assembly 76 commences passage under the end of the cam which is spaced at a maximum distance from the hammer assembly platform 12 at this point. As rotation continues, the roller 90 is urged downwardly as shown in FIG. 5, due to the progressively downwardly sloping incline of the cam surface. As the roller 90 moves downwardly, the striking head 78 of the hammer assembly is rotated upwardly about its pivot pin 84 as viewed in FIG. 4 against the tension of spring 92. As the roller 90 passes beneath and out from under the minimum spaced end of the cam surface, the cam surface no longer acts to urge the roller downwardly and releases the roller, and the tension of spring 92 causes the striking head 78 to rapidly rotate back to its original position as shown in the dot-and-dash lines of FIG. 4 to sharply impact head 72 of stud 68. Since the stud 68 is rigidly attached to the closed upper end of the impact collar 62, the impacting force produced by the striking head is transmitted through the stud, through the collar 62 to the upper shoulder of the container and thence to the contents of the container accelerating the container downwardly and causing the contents to hydrodynamically oscillate in the container due to the initial acceleration produced by the impact. The striking impact is of such magnitude that the contents of the container actually cavitate in an oscillating fashion when the vacuum level in the container is acceptable. However, if the vacuum level in the container is unacceptable, the oscillation of the contents will be rapidly damped by the compressible air present in the container. In any event, whatever acceleration is produced in the container by the initial impact or by the oscillations of the container contents, will be transmitted through the container directly to the plate 46 to produce corresponding vibrational oscillations in the plate. Such oscillations of the plate 46, in turn, will be directly transmitted to the accelerometer housing 108 and will cause compression or relaxation of the piezoelectric crystals 112 and 113 due to the inertia effect produced by the seismic mass 114. Such relaxation or compression generates electric signals in the crystals the characteristics of which directly correlate with the vacuum level.

ELECTRONIC DISCRIMINATION CIRCUIT

Figure 8:
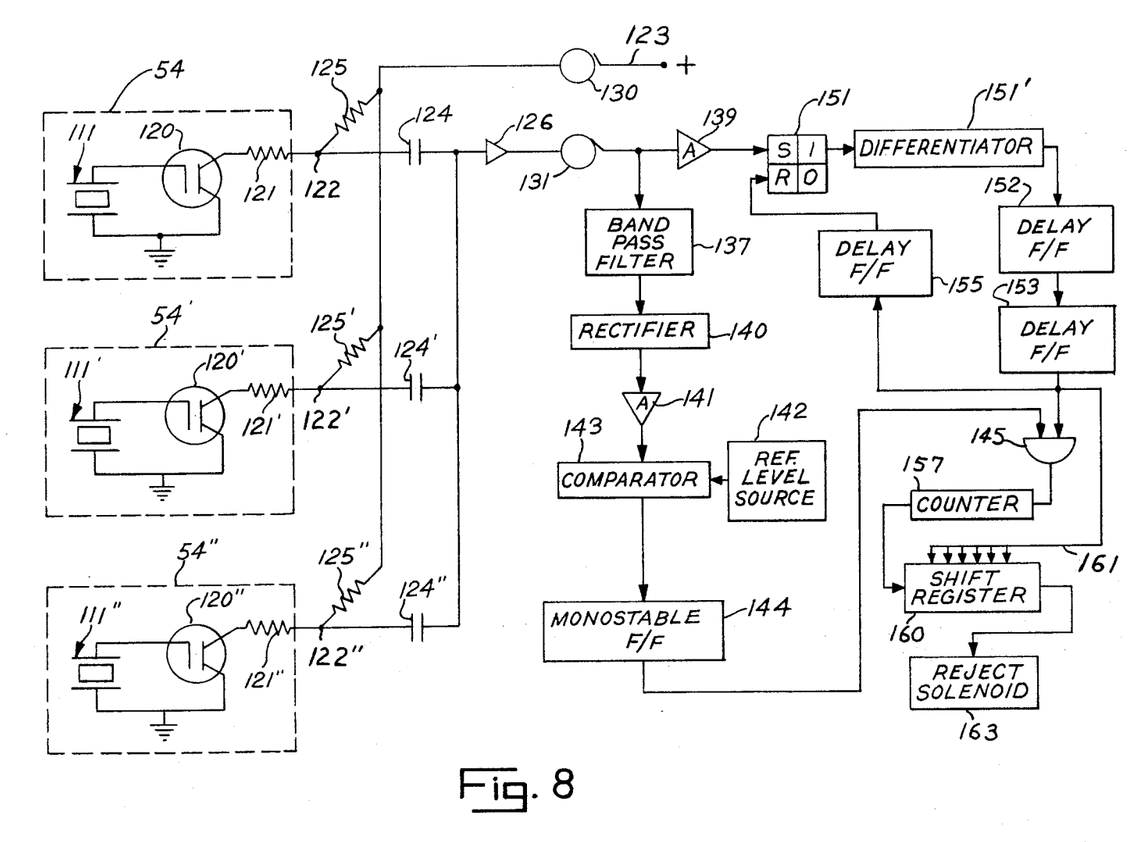
FIG. 8 is a block diagram of a circuit for discriminating between signal wave forms of the type shown in FIG. 7.

It is the purpose of the discriminating circuit shown in block diagram form in FIG. 8 to distinguish between (1) those wave forms which are produced by accelerometer 54 when the container being tested has an acceptable vacuum level and (2) those signals which are produced when the vacuum level in the container is not acceptable.

In FIG. 7 of the drawings, various typical accelerometer signal wave forms under differing container conditions are shown. When a "good" vacuum level exists in a filled container, a signal is produced by the accelerometer which is typified by the uppermost wave form of FIG. 7. If the vacuum level is "bad" or if the container is empty, signal wave forms as shown in the middle and lower plots respectively, are produced by the accelerometer. It may be noted that the "bad" vacuum wave form is almost the same as the wave form for a "good" container during the initial period of container acceleration. The two wave forms, however, exhibit substantially different wave forms thereafter, the wave form for the "good" container exhibiting oscillations of both substantial amplitude and sustained duration. In contrast, the "bad" container oscillations are of a decreased amplitude and duration. Quite distinct from both of these, an empty container produces an accelerometer signal wave form which is quite different from those produced by containers which are filled, the "empty" wave form differing from the two "filled" wave forms during both the initial and later periods.

In accordance with a principal feature of the present invention, containers which are both properly filled and in which the proper vacuum level obtains are distinguished from other containers by counting the number of oscillations which exceed a predetermined amplitude during a time interval delayed from the initial period of acceleration of the container. When the number of these oscillatory excursions which exceed the predetermined amplitude exceed a predetermined count, a positive indication that the container is acceptable results. Should the number of excursions in excess of of the predetermined amplitude be less than this predetermined count, a positive indication that vacuum level in the bottle is defective is obtained.

It should perhaps be pointed out that the accelerometer 54 which is employed in conjunction with the present invention due to the fact that it is firmly attached to the underside of plate 46 which directly supports and is held in contact with the container. It has been found that the character of the oscillatory vibrations of the container, plate 46 and the accelerometer 54 due to the hydrodynamic oscillating cavitation of the liquid contents of the container have an empirical relation to the vacuum level with the container. It is thus possible, by measuring the various vibrational excursions depicted in FIG. 7 of the container and plate which supports it, to distinguish between containers having an adequate vacuum level therein and those containers which are empty or have an inadequate vacuum level therein.

As has been noted, each of the plates 46 of the container support assemblies 30 is provided with an accelerometer 54 rigidly attached to the underside thereof. Referring to FIG. 8, the electrical equivalents of three accelerometers 54 (attached to three different support plates 46) are schematically depicted as 54, 54' and 54''. It will be understood that although three accelerometers are depicted, it is not contemplated that such number shall be limiting. Each accelerometer includes one of the crystal elements 111, 111' and 111'' respectively and a field-effect transistor 120, 120' and 120'' respectively. The transistors 120, 120' and 120'' are employed as impedance conversion devices. The transconductive path of each of the field-effect transistors 120, 120' and 120'' is connected in series with a resistor 121, 121' and 121,'' respectively between each of the output terminals 122, 122' and 122'' of each accelerometer and ground. A voltage supply bus 123 having a suitable source of DC power is connected to each of the accelerometers 54, 54' and 54'' by means of a resistor 125, 125' and 125'' respectively. Coupling capacitors 124, 124' and 124'' connect the output terminals 122, 122' and 122'' of each of the accelerometers to the input of shared amplifier 126.

Since each of the accelerometers 54, 54' and 54'' are mounted on a container support assembly 30 which rotates about a fixed axle, a pair of slip rings 130 and 131 are provided to couple respectively the power supply to the accelerometers and to couple the output signals from the accelerometers to the external circuitry which is located apart from the rotating structure. Signals from each of the accelerometers are supplied through the amplifier 126 and slip ring 131 to the input of a band-pass filter 137 as well as to the input of an amplifier 139. If desired, the electronic components numbered between 175 and 160 may also be mounted on the rotating assembly, in which case the slip ring 131 is replaced by a slip ring connected between shift register 160 and the reject solenoid 163.

Band-pass filter 137 passes those signal pulsations having the desired frequency range and limits the passage of noise having frequencies outside of the desired frequency range of the system. In practice, it has been found that the meaningful hydrostatic cavitation vibrations take place between 2 and 8 kilohertz and thus a filter having approximately this band-pass frequency range is desirable. The output of band-pass filter 137 is connected to the input of a half-wave rectifier 140 whose output is, in turn, connected to the input of an amplifier 141. The output of amplifier 141 is connected to the input of a comparator having a second input connected to a DC reference level source 142.

The comparator 143 supplies an output signal to a monostable flip-flop circuit 144 when, and only when, the oscillatory output from amplifier 141 exceeds a predetermined value. This predetermined value may be varied by adjusting the voltage output to the comparator of the reference level source 142. This reference output voltage is shown in FIG. 7 as $V_t$ where its magnitude may be readily compared to the wave forms of the signals entering the comparator. When the amplifier output exceeds the reference voltage $V_t$ and the output from the comparator circuit 143 appears, the monostable flip-flop 144 is "fired" to produce a pulse of standard duration, which pulse is delivered to one input of an AND gate 145. It may thus be seen that this first input to the AND gate 145 receives a pulse each time a signal potential is generated by the accelerometer which is in excess of reference voltage $V_t$.

Since the pulsations from the accelerometer 54 are to be counted only during a predetermined time interval, the second input to AND gate 145 is energized only during this interval. This is accomplished by applying the signals from amplifier 139 to the set terminal of flip-flop 151 when the first pulsations (in the first period during acceleration) of the accelerometer occur. A differentiator 151', connected to output of flip-flop 151, produces a pulse which is delivered to the input of a delay flip-flop 152. After a predetermined delay interval, flip-flop 152 changes state to energize a second delay flip-flop 153 which immediately energizes the second input to AND gate 145, holding the second input energized until flip-flop 153 "times out." Experimentation has shown that setting the first flip-flop 152 for a 5-millisecond delay and also setting the second flip-flop 153 to maintain its "ON" condition for an additional 5 milliseconds provides the appropriate timing for most small containers. The timing will, however, vary depending upon the size of container, the nature of its liquid contents, and the amount of acceleration to which the container is subjected. The appropriate "listening interval" during which the accelerometer should be monitored may be determined by viewing the output wave form of the accelerometer with an oscilloscope.

The output of flip-flop 153 is also connected to the input of a third delay flip-flop 155 whose output is connected to a reset terminal of flip-flop 151, conditioning flip-flop 151 to receive the next pulse. By resetting the flip-flop 151 only a short period before the next bottle is tested, the possibility of inadvertently triggering the flip-flop by means of noise signals is greatly lessened.

The output of the AND gate 145 is connected to the input of a digital counter circuit 157. Counter 157 may take a variety of forms but is characterized in that it delivers an activating signal to shift register 160 when the pulse count received from the AND gate 145 does not reach a predetermined number. For "good" vacuum levels in a container, the count will exceed this predetermined number. Thus, the shift register 160 is activated by the counter 157 only when a "bad" vacuum level is indicated.

Because the container being tested is being cycled through the testing apparatus, it is not generally in a position where it can be readily ejected from the apparatus if the vacuum level is not "good." Therefore, the shift register 160 is utilized to keep track of faulty containers until they reach a place in the production line spaced from the point at which they are tested where they may be automatically discarded.

As may be seen in FIG. 1, containers being tested are positioned under the cam surface 104 and must thereafter move through a number of container positions before they are passed outwardly from the testing apparatus. Faulty containers can be readily ejected from the line by means of a variety of known techniques such as a solenoid-operated ejecting arm 162 operated by solenoid 163 shown schematically in FIG. 1. When the solenoid 163 is energized, the arm 162 moves from its solid line position and is inserted into the path of the faulty container coming from the testing apparatus, as shown in dotted lines, to divert the faulty container from its normal path into a reject bin. The shift register 160 shown in FIG. 8 of the drawings advances one stage for each container being processed since an advance pulse line 161 is connected between it and the output of the flip-flop 153. Accordingly, the shift register 160 has a number of stages equal to the number of containers between the testing point and the reject point and the appropriate delay is accomplished such that the reject solenoid 163 is operated when the defective container reaches the ejecting arm and discharge bin in the production line.

It is to be understood that the container-testing arrangement which has been described is merely illustrative of one application of the principles of the invention. Numerous modifications may be made by those skilled in the art without departing from the true spirit and scope of the invention.

What we claim is:

1. Sealed-container-vacuum-testing apparatus comprising:
   means supporting the sealed container,
   impacting means for abruptly accelerating the container with a force sufficient to produce first hydrodynamic oscillations of the container contents when a first vacuum level obtains in the container and second hydrodynamic oscillations of the container contents when a second vacuum level obtains in the container, the first and second hydrodynamic oscillations being transmitted to the supporting means to produce first and second vibrational oscillations of said supporting means corresponding to said first and second hydrodynamic oscillations respectively,
   vibrational-oscillation-sensing means mounted on said supporting means for generating first and second electric signals in response to and corresponding with said first and second vibrational oscillations respectively, and
   discriminating means responsive to said first and second signals to measure the vacuum level in said container.

2. The apparatus of claim 1 wherein said vibrational-oscillation-sensing means is an accelerometer.

3. The apparatus of claim 2 wherein said supporting means comprises a plate upon which said container is adapted to be mounted in an upright position, spring means normally urging said plate toward said impacting means, and said accelerometer is mounted on said plate.

4. The apparatus of claim 1 wherein said means for abruptly accelerating the container comprises a collar constructed and arranged to receive the top of said container therein in contacting relationship therewith, and hammer means for striking said collar to accelerate the collar, whereby when said collar is struck the acceleration is imparted to the container.

5. The apparatus of claim 1 wherein
   said supporting means comprises a plurality of plates, each of said plates being adapted to mount one of said containers in an upright position,
   a testing station including said means for abruptly accelerating said container,
   means for sequentially moving each of said plates and their associated containers relative to said testing station and into alignment with said impacting means,
   spring means normally urging each of said plates in a direction toward each of said impacting means, and
   said vibrational-oscillation-sensing means comprises a plurality of accelerometers one each mounted on each of said plates, whereby the accelerometer of the plate located in said testing station generates said first or second signals when the container is accelerated in said station.

6. The apparatus of claim 5 wherein said impacting means comprises a plurality of hammer members, one each pivotally mounted above one of said plates, a plurality of impact-transmitting members one each associated with one of said hammer members and constructed to contact the container and be impacted by the hammer member, and cam-actuating means associated with said testing station for pivoting the hammer member located at the testing station to impact the impact-transmitting member at the testing station.

7. The apparatus of claim 6 wherein said testing station is stationary, and said moving means consecutively in order moves said plates and their associated hammer members and impact-transmitting members into and out of said station.

8. The apparatus of claim 5 wherein said means for abruptly accelerating said container includes a ring constructed and arranged to receive the top of said container therein in contacting relationship therewith, and said moving means includes piston means attached to each of said plates for positioning the containers in said contacting relationship.

9. A method of testing the vacuum in a sealed container comprising;
   abruptly accelerating the container with a force sufficient to produce first hydrodynamic oscillations of the container contents when a first vacuum level obtains in the container and second hydrodynamic oscillations of the container contents when a second vacuum level obtains in the container,
   overcoming the inertia of a seismic mass and setting the mass into oscillatory motion relative to the container in response to the first and second hydrodynamic oscillations,
   sensing the characteristics of said oscillatory motion, and
   accepting the container in response to the oscillatory motion of the seismic mass produced by said first hydrodynamic oscillations and rejecting the container in response to the oscillatory motion of the seismic mass produced by said second hydrodynamic oscillations.

10. The method of claim 9 wherein said container is accepted or rejected in response to the frequency and amplitude of the oscillatory motion of the seismic mass.

11. The method of claim 9 wherein the container is abruptly accelerated by percussion.

12. Apparatus for testing the vacuum in a sealed container comprising;
   means for abruptly accelerating the container and its contents with a force sufficient to produce hydrodynamic oscillations of its contents,
   means for producing an oscillating waveform signal in response to and corresponding with said hydrodynamic oscillations,
   means for counting the number of waves of said waveform signal which exceed a predetermined amplitude over a predetermined time duration,
   delay means for delaying the commencement of said time duration for a predetermined time after the initiation of the abrupt acceleration of the container, and
   means for accepting the container if the wave count exceeds a predetermined number and rejecting the container if the wave count is less than said predetermined number.

13. The apparatus of claim 12 wherein said means for producing the oscillating waveform signal comprises;
   means for supporting the container in direct contact therewith and moveable in response to the hydrodynamic oscillations of the container, and
   an accelerometer firmly mounted on the supporting means, said accelerometer being responsive to the movement of the supporting means for generation of said signal.

14. The apparatus of claim 12 wherein said means for abruptly accelerating the container comprises a percussion member which imparts a blow to the container.

15. The apparatus of claim 12 wherein said means for counting includes,
   comparator means having said waveform signal as an input, and
   reference means providing a reference input of a predetermined magnitude to said comparator means, said comparator means producing an output signal in response to each wave of the waveform signal input which has a greater amplitude than the magnitude of said reference input, and producing no output signal when a wave of the waveform signal input has an amplitude less than the magnitude of said reference input, and said means for counting counts the number of output signals of said comparator means.

16. The apparatus of claim 15 wherein said waveform input signal comprises an oscillating electrical voltage of variable amplitude and said reference input comprises an electrical voltage of a steady predetermined magnitude.

17. The apparatus of claim 15 wherein said delay means prevents the counting of said comparator means output signals during a time other than said time duration.

UNITED STATES PATENT OFFICE
CERTIFICATE OF CORRECTION

Patent No. 3,596,501  Dated August 3, 1971

Inventor(s) Ronald R. Forry et al

It is certified that error appears in the above-identified patent and that said Letters Patent are hereby corrected as shown below:

Column 7, following last word in line 8, please insert the phrase --measures the actual vibratory movement of the container itself--

Signed and sealed this 11th day of April 1972.

(SEAL)
Attest:

EDWARD M. FLETCHER, JR.
Attesting Officer

ROBERT GOTTSCHALK
Commissioner of Patents